United States Patent Office 3,642,626
Patented Feb. 15, 1972

3,642,626
GREASE COMPOSITION COMPRISING
POLYFLUOROALKYL-POLYSILOXANE
John B. Christian, Yellow Springs, Ohio, assignor to the
United States of America as represented by the Secretary of the Air Force
No Drawing. Filed May 9, 1969, Ser. No. 823,475
Int. Cl. C10m 7/48
U.S. Cl. 252—33.6
10 Claims

ABSTRACT OF THE DISCLOSURE

This invention comprises an improved grease having improved wear, improved extreme pressure characteristics and improved temperature range utility comprising a polyfluoroalkyl-alkyl polysiloxane as a base, fluorinated copolymer of ethylene and propylene as a thickener and antimony dialkyl dithiocarbamate. The improved grease of this invention has particular utility in aircraft and other equipment where heavy loads are prevalent and little or no wear can be tolerated.

The invention described herein may be manufactured and used by or for the U.S. Government for governmental purposes without payment to me of any royalty thereon.

BACKGROUND OF THE INVENTION

Field of the invention

The present invention relates to an improved grease composition having a polyfluoroalkyl-alkyl polysiloxane base.

Greases capable of providing lubrication under extreme pressure with resultant reduced wear and of functioning over a broad temperature range are constantly being sought. This is particularly true in present and future aircraft and other equipment where heavy loads are prevalent and little or no wear can be tolerated.

It is, accordingly, an object of this invention to provide an improved grease composition which will not fail to provide lubrication over a wide temperature range and under extreme pressures and thereby reduce wear of the equipment being lubricated.

SUMMARY OF THE INVENTION

The various objects cited above and other advantages are achieved by a grease composition comprising:
 (a) A polysiloxane base having the formula

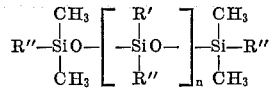

wherein:

R' is hydrogen or an aliphatic hydrocarbon radical of 1–3 carbon atoms,
R'' is methyl, ethyl, vinyl, phenyl or —CH$_2$CH$_2$R in which R represents a perfluororadical of 1–10 carbon atoms with at least half of the R'' groups representing —CH$_2$CH$_2$R, and
$n$ is an integer having a value of 1 to 150, preferably 40 to 150;
 (b) A fluorinated ethylene-propylene copolymer prepared by the copolymerization of perfluoropropylene and tetrafluoroethylene; and
 (c) An antimony dialkyl dithiocarbamate having the formula

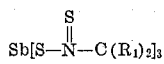

wherein R$_1$ is an alkyl group having 1–12 carbon atoms, preferably 4–10 carbon atoms.

The proportions of the various components are as follows: 60–65% by weight of the polysiloxane, 32–35% of the fluorinated ethylene-propylene copolymer, and 3–6% antimony dialkyl dithiocarbamate. The antimony compound can be used in larger amounts, but the larger amounts have no added advantage over the range indicated. Very small amounts of other fillers such as sodium montmorillonite, aryl urea (prepared by reacting one mole of bitolylene diisocyanate with one mole of p-Cl-aniline and one mole of p-toluidine), and the molybdenum disulfide can be used in place of up to about 3% of the fluorinated ethylene-propylene copolymer without seriously deteriorating the properties of the grease. However the three component system as indicated is preferred.

A polysiloxane preferred in the practice of this invention is

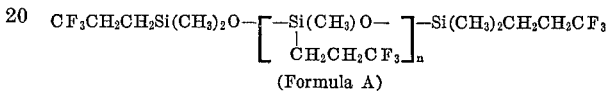

(Formula A)

Other polysiloxanes embraced by the above general polysiloxane formula and suitable for use in the invention are disclosed in U.S. Patent 2,961,425. For the purposes of this invention, the polysiloxane advantageously has a molecular weight and value of $n$ such as to give a viscosity of 50–100 cs., preferably 65–85 cs. at 100° F.

The polysiloxanes useful in the practice of this invention are prepared according to the procedure of U.S. Patent 2,961,425, and where the repeating units within the bracket of the formulas consist of two different siloxane radicals, these are derived by using a mixture of the siloxane compounds from which the repeating units are derived.

Another polysiloxane preferred for the practice of this invention has the formula

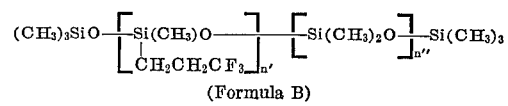

(Formula B)

The two siloxane groups within the brackets can be in alternating order or at random or in series of similar repeating units with $n'$ and $n''$ representing integers of approximately the same value and totaling to the value of $n$. The preferred values for $n'$ and $n''$ are in the range of 20–75.

Other typical polysiloxanes useful in the practice of this invention include:

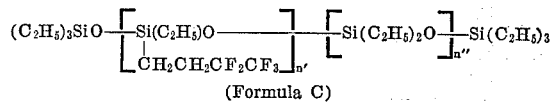

(Formula C)

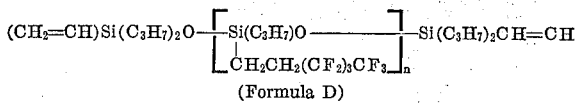

(Formula D)

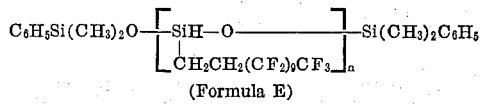

(Formula E)

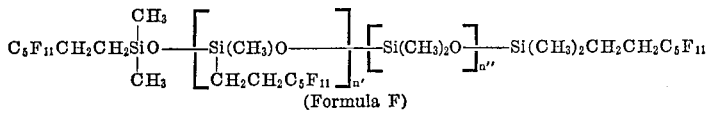

(Formula F)

The polysiloxane advantageously has a viscosity at 100° F. in the range of 50-100 cs., preferably 65-85 cs.

It is also desirable that the viscosity at various other temperatures be in the following ranges:

| | Cs. |
|---|---|
| At 200° F. | 15-25 |
| At 0° F. | 650-725 |
| At −65° F. | 10,000-11,000 |

Other desirable properties include:

Pour point—below −80° F.
Flash point—above 500° F.
Fire point—above 600° F.
Four ball wear scar, 1200 r.p.m., 400° F., 40 kg. load, 2 hours, M-10 steel balls—no more than 1.2 mm.

It is found that polysiloxanes having the formulas described above generally have these appropriate other properties when the viscosity at 100° F. is 65-85 cs.

A particularly effective polysiloxane, such as the trifluoropropylmethyl-dimethylpolysiloxane (Formula B) has the following properties:

Viscosity at 100° F.—75.2 cs.
Viscosity at 200° F.—21.7 cs.
Viscosity at 0° F.—692.2 cs.
Viscosity at −65° F.—10,427.0 cs.
Pour point—below −85° F.
Flash point—555.0° F.
Fire point—680.0° F.
Density—1.136 g./cc.
Refractive Index—1.3851 to 1.3853
Four ball wear scar, 1200 r.p.m., 400° F., 40 kg. load, 2 hours, M-10 steel balls—1.295 mm.

The fluorinated ethylene-propylene copolymer is a copolymer of perfluoro propylene and tetrafluoro ethylene, preferably of equimolar amounts so that the copolymer preferably has the structure:

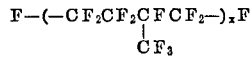

The copolymer has a molecular weight of 120,000-190,000, preferably 140,000-160,000, and advantageously one appropriate to give a density of 2.391-2.467 g./cc. The copolymer particles are of 0.05 to 0.25 micron size and give a minimu msurface of 1.0 square meters per gram.

The grease of this invention is found to work in an extraordinarily good manner in heavily loaded air frame bearings, screwjack actuators, journal bearings, gear boxes, and in other applications where there is sliding, rolling, oscillating, and other forms of motion in which extreme pressure and wear are factors.

SPECIFIC EMBODIMENTS OF THE INVENTION

This invention is illustrated by the following examples. These examples are intended for illustrative purposes and are not to be interpreted as a limitation on the scope of the invention nor the manner in which it may be practiced. Parts and percentages are givey by weight.

Example I.—A number of grease compositions are prepared using the components and proportions indicated below in Table I. In most cases the components are merely heated and stirred until uniform mixtures are obtained. However in preparing the aryl urea grease, the polysiloxane fluid is divided into three parts, two-thirds of the fluid being placed in a first container, one-sixth in a second container and one-sixth in a third container. Bitolylene diisocyanate (53 parts) is added to the first container, p-chloroaniline (26 parts) is added to the second container, and p-toluidine (21 parts) is added to the third container. The contents of the three containers are then heated to 180-200° F. while stirring for about 15-20 minutes. The contents of the three containers are then mixed to produce the appropriate amount of aryl urea. The mixture is then further blended to grease consistency by passing it five times through a 3-roll paint mill with the rollers set at an opening of 0.002" at room temperature. In the case where molybdenum disulfide is to be added, it is thoroughly mixed with the bitolylene diisocyanate solution prior to mixing with the contents of the other two containers. In testing the various compositions, the penetration is determined in accordance with Method 313.2 of Federal Test Methods Standard No. 791a. The four ball wear is determined by Method 6514 of the same standard and the Main Hertz Load is determined by Method 6503 of the same standard. Starting and running Torque are determined by Method 334 of the same standard, and the spindle test is determined by Method 333 of the same standard. The oscillation test is determined according to Military Specification MIL-G-27549. These results are also tabulated in Table I.

TABLE I

| | A | B | C | D | E | F | G | H | Best comm. product |
|---|---|---|---|---|---|---|---|---|---|
| Components, percent: | | | | | | | | | |
| Trifluoropropylmethyl-dimethyl polysiloxane (Formula B) [1] | 62 | 65 | 69 | 63 | 65 | 77 | 72 | 65 | |
| Fluorinated ethylenepropylene copolymer [2] | 33 | 30 | 16 | 34 | 35 | | | 17 | |
| Antimony diamyl dithiocarbamate | 5 | | 3 | 3 | | | | 6 | |
| Sodium montmorillonite (Baragel-24 clay) | | | 12 | | | | | 12 | |
| Aryl urea | | | | | | 20 | 18 | | |
| Molybdenum disulfide | | 5 | | | | 3 | 10 | | |
| Test results: | | | | | | | | | |
| 0 stroke | 292 | 335 | 324 | 314 | 324 | 346 | 339 | 308 | 301 |
| 60 strokes | 314 | 367 | 357 | 340 | 342 | 378 | 369 | 335 | 295 |
| 10,000 strokes | 324 | 355 | 360 | 334 | 348 | 378 | 353 | 343 | 345 |
| Temperature range (° F.) | −100-450 | −100-450 | −100-450 | −100-450 | −100-450 | −100-450 | −100-450 | −100-450 | −65-425 |
| 4-ball wear at 40 kg. load, 1,200 r.p.m., 400° F., M-10 steel, 2 hrs., mm. wear scar | 0.94 | 1.60 | 0.83 | 0.93 | 1.90 | 1.30 | 1.60 | .90 | 3.0 |
| Mean Hertz load | 115 | 61 | 44 | 77 | 40 | 70 | 77 | 52 | 60 |
| Torque at −100° F.: | | | | | | | | | |
| Starting, g.-cm | 2,800 | 2,100 | 3,665 | 2,700 | 2,800 | 2,900 | 2,850 | 3,650 | 8,000 |
| Running, g.-cm | 900 | 900 | 1,000 | 850 | 850 | 900 | 800 | 1,000 | 2,000 |
| Spindle test at 450° F., 10,000 r.p.m., 5 lbs., hours | 1,690 | 100 | 86 | 1,600 | 937 | 160 | 80 | 96 | 491 |
| Oscillating test at 450° F. in accordance with MIL-G-27549, 1,000 cycles | 136 | 121 | 150 | 80 | 70 | 102 | 100 | 159 | 60 |
| Comments | Best | N.G. | N.G. | Acc. | N.G. | N.G. | N.G. | N.G. | N.G. |

[1] Properties listed above.
[2] Copolymer of 50-50 mole percent of perfluoropropylene and tetrafluoroethylene having density of 2.182, average size of particles is 0.15 microns, surface area of particles 1.2 sq. mm./g., and melting point of 570° F. and with molecular weight of 150,000.

NOTE.—N. G.=not good enough; Acc.=acceptable.

It will be noted from Table I that Composition A gives the best results. Composition D is acceptable, but is not as good as Composition A. Compositions B, C, E, F, G and H are unacceptable in one respect or another. The best prior art grease composition known is also tested and the results reported in the last column of the table. In every respect, Composition A is an improvement over this prior art composition, including a broader temperature range of —100° F. to 450° F., as compared to —65° F. to 425° F. for the prior art composition. The four-ball wear test and the starting and running torques at —100° F. are both lower, and therefore better, than the results for the prior art grease. The Mean Hertz load, the spindle test and the oscillating test are all higher, and therefore better, for Composition A as compared to the prior art grease.

Example II.—The procedure of Example I is repeated with improved results as compared to the prior art grease, using in place of the polysiloxane of Example I, an equal weight of the polysiloxanes having Formulas A, C, D and E, the viscosity of the polymer in each case being equivalent to that used in Example I.

Example III.—The procedure of Example I is repeated with improved results as compared to the prior art grease using individually in place of the fluorinated copolymer of Example I an equivalent weight respectively of:

(a) 10–90 (Molar) copolymer of perfluoropropylene and tetrafluoroethylene;
(b) 30–70 (Molar) copolymer of perfluoropropylene and tetrafluoroethylene;
(c) 60–40 (Molar) copolymer of perfluoropropylene and tetrafluoroethylene; and
(d) 80–20 (Molar) copolymer of perfluoropropylene and tetrafluoroethylene.

In each case the viscosity of the copolymer is similar to that of Example I.

Example IV.—The procedure of Example I is repeated with similar results using in place of the antimony diamyldithiocarbamate an equal weight respectively of the corresponding dibutyl, dihexyl and dioctyl compounds.

While certain features of this invention have been described in detail with respect to various embodiments thereof, it will, of course, be apparent that other modifications can be made within the spirit and scope of this invention and it is not intended to limit the invention to the exact details shown above except insofar as they are defined in the following claims.

The invention claimed is:

1. An improved grease composition consisting essentially of 60–65% by weight of a polyfluoroalkyl polysiloxane, 32–35% by weight of a copolymer of perfluoropropylene and tetrafluoroethylene having at least 10 mole percent of each comonomer therein, and 3–6% by weight of an antimony dialkyldithiocarbamate, wherein said alkyl radical has 1–12 carbon atoms therein, said polyfluoroalkyl polysiloxane having the formula

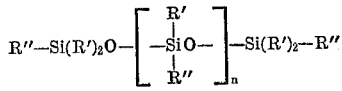

wherein
R' is hydrogen or an aliphatic hydrocarbon radical of 1–3 carbon atoms,
R'' is methyl, ethyl, vinyl, phenyl or —CH$_2$CH$_2$R wherein R is a perfluoro radical of 1–10 carbon atoms, with at least half of the R'' groups representing —CH$_2$CH$_2$R groups, and
$n$ is an integer having a value of 1–150.

2. The composition of claim 1 in which said polyfluoro polysiloxane has the formula

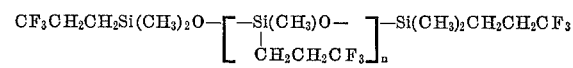

3. The composition of claim 2 in which said antimony compound is antimony diamyldithiocarbamate.

4. The composition of claim 1 in which said polyfluoro polysiloxane has the formula

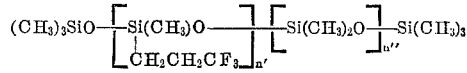

wherein $n'$ and $n''$ are integers of approximately the same value and total in the range of 40–150.

5. The grease composition of claim 4 in which said antimony compound is antimony diamyldithiocarbamate.

6. The composition of claim 5 in which said copolymer of perfluoropropylene and tetrafluoroethylene has approximately equal molar portions of perfluoropropylene and tetrafluoroethylene therein.

7. The composition of claim 6 in which said copolymer has a density of 2.184–2.179, a particle size of 0.05 to 0.25 micron, a minimum surface area of 1 square meter, and a melting point of 560–575° F.

8. A composition of claim 1 in which said copolymer is a copolymer of approximately equal molar portions of perfluoropropylene and tetrafluoroethylene.

9. The composition of claim 8 in which said copolymer has a density of 2.184–2.179, a particle size of 0.05 to 0.25 micron, a minimum surface area of 1 square meter, a melting point of 560–575° F., and a molecular weight of 140,000–160,000.

10. The composition of claim 1 in which the molecular weight of said copolymer is in the range of 120,000 to 190,000.

References Cited

UNITED STATES PATENTS

| | | | |
|---|---|---|---|
| 2,652,362 | 9/1953 | Woods et al. | 252—33.6 |
| 2,961,425 | 11/1960 | Pierce et al. | 260—448.2 |
| 3,133,020 | 5/1964 | Scott | 252—33.6 |
| 3,139,405 | 6/1964 | Farmer et al. | 252—33.6 |
| 3,239,462 | 3/1966 | Bergstrom et al. | 252—33.6 |
| 3,248,326 | 4/1966 | Swenson | 252—49.6 |
| 3,314,889 | 4/1967 | Christian | 252—49.6 |

DANIEL E. WYMAN, Primary Examiner

I. VAUGHN, Assistant Examiner

U.S. Cl. X.R.

252—49.6